United States Patent
Hirohara et al.

(10) Patent No.: US 10,605,386 B2
(45) Date of Patent: Mar. 31, 2020

(54) METHOD FOR ATTACHING FILLER PIPE AND FILLER PIPE ATTACHMENT STRUCTURE

(71) Applicant: Yachiyo Industry Co., Ltd., Sayama-shi, Saitama (JP)

(72) Inventors: Takeshi Hirohara, Tochigi (JP); Shunsuke Tsukahara, Tochigi (JP)

(73) Assignee: YACHIYO INDUSTRY CO., LTD., Sayama-Shi (JP)

( * ) Notice: Subject to any disclaimer, the term of this patent is extended or adjusted under 35 U.S.C. 154(b) by 644 days.

(21) Appl. No.: 14/893,550

(22) PCT Filed: May 23, 2014

(86) PCT No.: PCT/JP2014/063673
§ 371 (c)(1),
(2) Date: Nov. 24, 2015

(87) PCT Pub. No.: WO2014/192651
PCT Pub. Date: Dec. 4, 2014

(65) Prior Publication Data
US 2016/0109042 A1    Apr. 21, 2016

(30) Foreign Application Priority Data
May 29, 2013    (JP) .................. 2013-112650

(51) Int. Cl.
*F16L 13/02* (2006.01)
*F16L 23/00* (2006.01)
(Continued)

(52) U.S. Cl.
CPC .............. *F16L 13/02* (2013.01); *B60K 15/04* (2013.01); *F16L 23/00* (2013.01); *F16L 25/00* (2013.01);
(Continued)

(58) Field of Classification Search
CPC ............ F16L 23/00; F16L 25/00; F16L 13/02
(Continued)

(56) References Cited

U.S. PATENT DOCUMENTS

2003/0173776 A1    9/2003    Morohoshi et al.
2012/0228292 A1    9/2012    Doble et al.

FOREIGN PATENT DOCUMENTS

JP    2005-041267    2/2005
JP    2006-021565    1/2006
(Continued)

OTHER PUBLICATIONS

International Search Report dated Jul. 29, 2014, Application No. PCT/JP2014/063673.
Chinese Office Action dated Mar. 2, 2017, 6 pages.

*Primary Examiner* — Anna M Momper
*Assistant Examiner* — Fannie C Kee
(74) *Attorney, Agent, or Firm* — Rankin, Hill & Clark LLP

(57) ABSTRACT

Provided is a method that is for attaching a filler pipe. The method for attaching a filler pipe attaches a filler pipe to the aperture of a fuel tank with an attachment member therebetween, and is characterized by containing: a fitting step for fitting the tubular attachment member to the inside of the aperture of the filler pipe; a contact step for contacting, to the surface at the periphery of the aperture of the fuel tank, a first flange protruding outwards in the radial direction from the outer peripheral surface of the attachment member, and a second flange protruding outwards in the radial direction from the outer peripheral surface of the filler pipe; and a welding step for welding the first flange and second flange to the surface.

2 Claims, 3 Drawing Sheets

(51) Int. Cl.
    *F16L 25/00*    (2006.01)
    *B60K 15/04*    (2006.01)
    *F02M 37/00*    (2006.01)
    *B60K 15/03*    (2006.01)

(52) U.S. Cl.
    CPC ............... *B60K 2015/0346* (2013.01); *B60K 2015/047* (2013.01); *F02M 37/0017* (2013.01)

(58) Field of Classification Search
    USPC .................... 285/189, 192, 194, 205, 208
    See application file for complete search history.

(56)            References Cited

FOREIGN PATENT DOCUMENTS

| JP | 2008-207761 | 9/2008 |
| JP | 2009-092180 | 4/2009 |
| JP | 2011-126314 | 6/2011 |
| JP | 2012-051411 | 3/2012 |
| WO | 2012/001894 | 1/2012 |

FIG.3A
(PRIOR ART)
FIG.3B
(PRIOR ART)
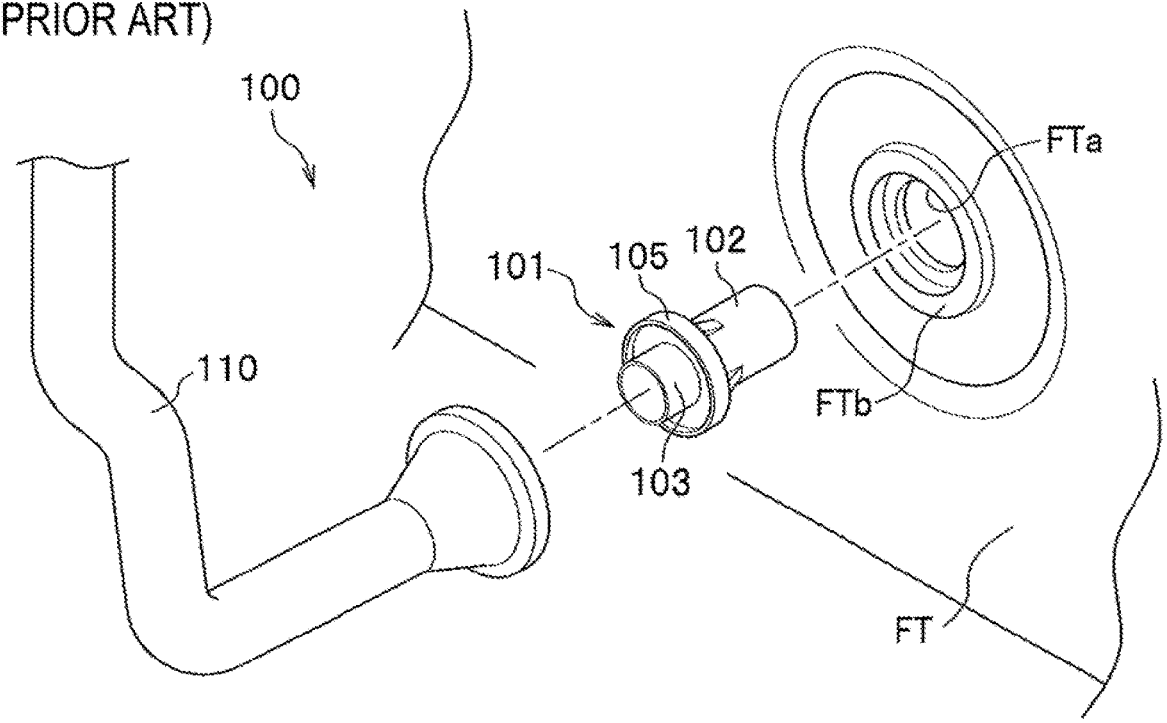
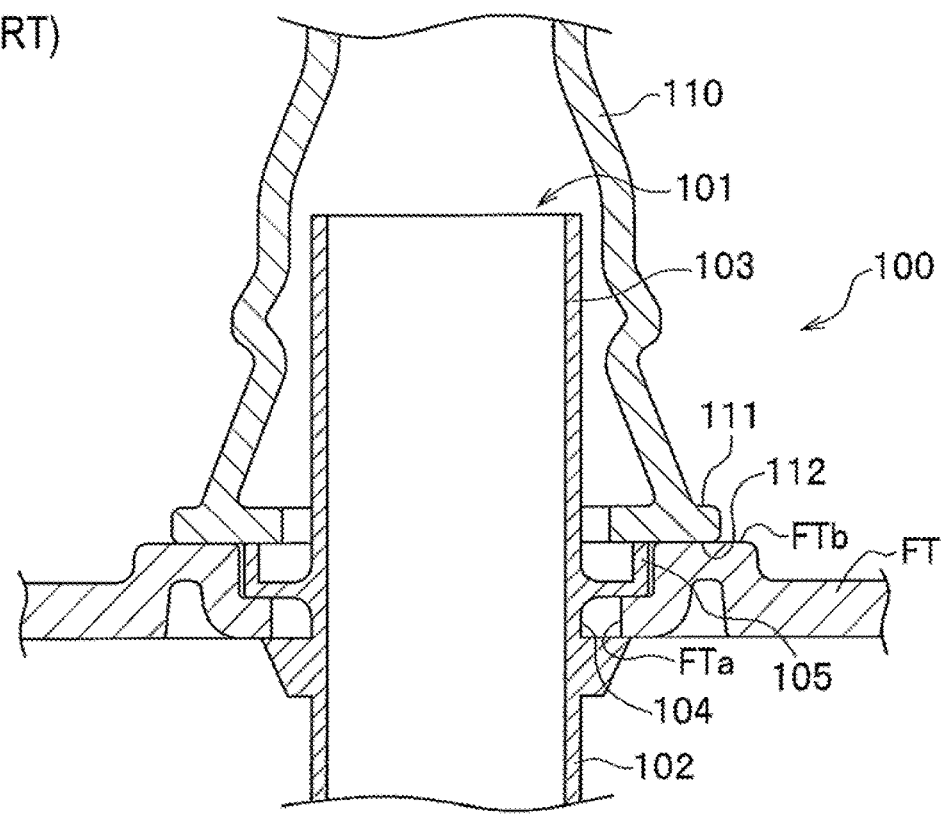

METHOD FOR ATTACHING FILLER PIPE AND FILLER PIPE ATTACHMENT STRUCTURE

TECHNICAL FIELD

The present invention relates to a filler-pipe attachment method and a filler-pipe attachment structure for attaching a filler pipe to a fuel tank.

BACKGROUND ART

For example, Patent Literature 1 discloses a filler-pipe attachment structure for attaching a filler pipe to a fuel tank. The conventional filler-pipe attachment structure is mainly constituted by an inlet check valve and a filler tube. The inlet check valve is inserted into an opening of the fuel tank, and the filler tube is fitted onto an outer circumferential surface of an end of the inlet check valve. (Hereinafter, the inlet check valve may be referred to as an ICV.) The filler tube is a connection member having a cylindrical shape and being provided for connecting the filler pipe to the ICV.

A flange which radially protrudes outward is formed on the ICV, and is welded to a surface around the opening of the fuel tank. However, in the above structure, there is a possibility that hydrocarbon penetrates through the boundary between the inner circumferential surface of the filler tube and the outer circumferential surface of the ICV. Specifically, the penetration amount of hydrocarbon is increased by the penetration of hydrocarbon through the boundary between the inner circumferential surface of the filler tube and the outer circumferential surface of the ICV. In addition, the necessity of the filler tube increases the number of parts.

The filler-pipe attachment structure 100 illustrated in FIGS. 3A and 3B is conventionally known as a solution of the above problems. FIGS. 3A and 3B include diagrams illustrating the conventional filler-pipe attachment structure, where FIG. 3A is a perspective diagram, and FIG. 3B is a magnified view of an essential portion. As illustrated in FIG. 3A, the conventional filler-pipe attachment structure 100 is constituted by an ICV 101 and a filler pipe 110. The ICV 101 is inserted through an opening FTa of the fuel tank FT, and the filler pipe 110 is inserted into an end of the ICV 101.

In the ICV 101, as illustrated in FIG. 3B, the ICV 101 includes an inserted portion 102, a protruding portion 103, a concave groove 104, and a rising portion 105. The inserted portion 102 is inserted inside the fuel tank FT. The protruding portion 103 protrudes to the outside of the opening FTa. The concave groove 104 is fitted to an edge portion of the opening FTa. The rising portion 105 rises parallel to the protruding portion 103 from a groove wall of the concave groove 104. On the other hand, a flange 111 radially protruding outward and being perpendicular to the axial direction of the filler pipe 110 is formed at an end of the filler pipe 110.

In assembly of the filler-pipe attachment structure 100, a face FTb of the fuel tank FT and the rising portion 105 are welded to an opposed face 112 of the flange 111 after the concave groove 104 of the ICV 101 is assembled to the opening FTa.

CITATION LIST

Patent Literature

Patent Literature 1: Japanese Patent Laid-open No. 2009-92180

SUMMARY OF INVENTION

Technical Problem

However, in the filler-pipe attachment structure 100, the concave groove 104 of the ICV 101 is required to be assembled to the opening FTa of the fuel tank FT before the welding. Therefore, the shape around the opening FTa and the shape of the ICV 101 become complex. In addition, when misalignment is caused by assembly error occurring in the assembly of the fuel tank FT and the ICV 101, the welding becomes difficult.

The present invention has been made in view of the above circumstances, and the object of the present invention is to provide a filler-pipe attachment method and a filler-pipe attachment structure which enable easy assembly and reduction of the penetration amount of hydrocarbon.

Solution to Problem

In order to achieve the above object, according to the present invention, a filler-pipe attachment method for attaching a filler pipe to an opening of a fuel tank through an attachment member is provided. The filler-pipe attachment method according to the present invention is characterized in including: a fitting step of fitting the attachment member into an opening of the filler pipe, where the attachment member has a cylindrical shape; an abutting step of bringing a first flange and a second flange into contact with a face around the opening of the fuel tank, where the first flange radially protrudes outward from an outer circumferential surface of the attachment member, and the second flange radially protrudes outward from an outer circumferential surface of the filler pipe; and a welding step of welding the first flange and the second flange to the face.

According to the above method, the first flange and the second flange are brought into contact with the face of the fuel tank around the opening of the fuel tank after the cylindrical attachment member is fitted into the opening of the filler pipe. Therefore, the operations for preparing for the welding can be easily performed. In addition, since the attachment member (e.g., an ICV) is not assembled to the fuel tank in advance as in the conventional method, assembly error is unlikely to occur, so that attachment can be achieved with high precision. Further, since the attachment member is not assembled to the fuel tank in advance, the structure around the opening of the fuel tank and the structure of the attachment member can be simplified, and the respective members can be easily manufactured. Furthermore, since both of the first flange and the second flange are welded to the face of the fuel tank, the penetration amount of hydrocarbon can be reduced.

It is preferable that a first opposed face of the first flange which is opposed to the aforementioned face and a second opposed face of the second flange which is opposed to the aforementioned face be brought flush with each other in the fitting step.

According to the above method, the first opposed face and the second opposed face can be brought into contact with the face of the fuel tank with high precision. Therefore, the welding can be performed more easily and precisely.

Further, according to the present invention, a filler-pipe attachment structure in which a filler pipe is attached to an opening of a fuel tank through an attachment member is provided. The filler-pipe attachment structure according to the present invention is characterized in that the attachment member includes a main body portion having a cylindrical shape and being inserted through the opening of the fuel tank, a protruding portion having a cylindrical shape, continuing to the main body portion, and protruding to outside of the opening of the fuel tank, and a first flange radially protruding outward from an outer circumferential surface of the protruding portion; the filler pipe includes a base portion which has a cylindrical shape and to which the protruding portion is fitted, and a second flange which radially protrudes outward from an outer circumferential surface of the base portion; and a first opposed face of the first flange which is opposed to a face around the opening of the fuel tank and a second opposed face of the second flange which is opposed to the face are flush with each other, and the first opposed face and the second opposed face are welded to the face around the opening of the fuel tank.

According to the above structure, the first opposed face and the second opposed face can be easily and precisely brought into contact with the face of the fuel tank. Therefore, the welding can be performed more easily and precisely. In addition, since both of the first flange and the second flange are welded to the face, the penetration amount of hydrocarbon can be reduced.

It is preferable that the first flange be formed to curve convexly toward the side farther from the opening of the fuel tank along the axial direction of the opening of the fuel tank.

According to the above structure, stress can be concentrated to the portion at which the first flange comes in contact with the face of the fuel tank. Therefore, the precision in the welding can be further improved.

Advantageous Effect of Invention

The filler-pipe attachment method and the filler-pipe attachment structure according to the present invention enable easy assembly and reduction of the penetration amount of hydrocarbon.

BRIEF DESCRIPTION OF THE DRAWINGS

FIGS. 3A and 3B illustrate a conventional filler-pipe attachment structure, where FIG. 3A is a perspective view and FIG. 3B is a magnified cross-sectional view of an essential portion.

DESCRIPTION OF EMBODIMENT

Figure 1:
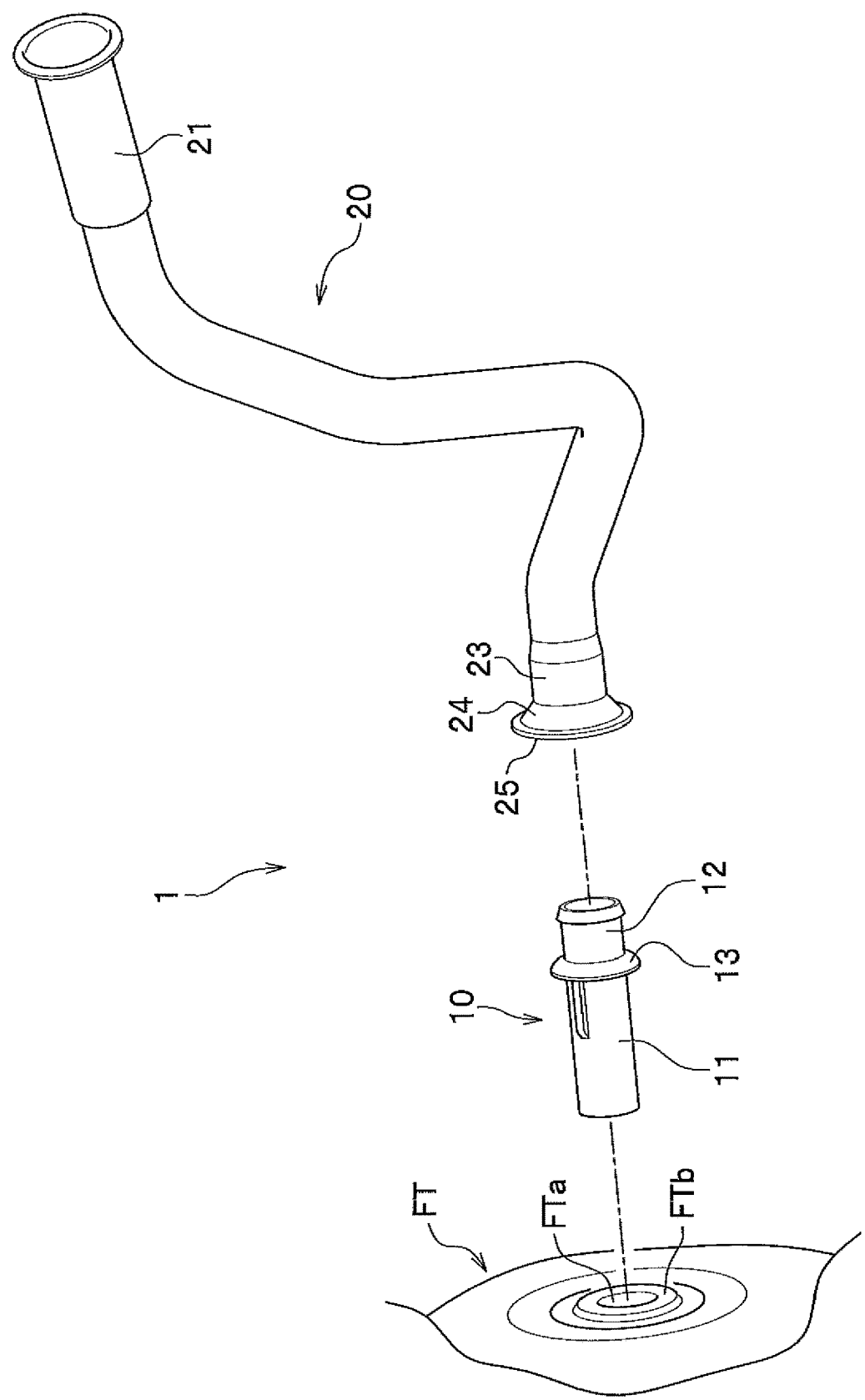
FIG. 1 is an exploded perspective view of a filler-pipe attachment structure according to an embodiment of the present invention.

Hereinbelow, a filler-pipe attachment structure according to an embodiment of the present invention is explained in detail with reference to the drawings. As illustrated in FIG. 1, the filler-pipe attachment structure 1 is mainly constituted by a fuel tank FT, an attachment member 10, and a filler pipe 20.

The fuel tank FT is a hollow container being formed of resin and reserving fuel. The fuel tank FT has a multilayered structure which includes, for example, a thermoplastic layer, a barrier layer formed of EVOH (Ethylene-vinyl alcohol copolymer resin), and other layers.

The opening FTa is formed through a side wall of the fuel tank FT. The opening FTa in the present embodiment has a round shape. An annular flat face FTb is formed along the outer periphery of the opening FTa.

The attachment member 10 is a member attached between the fuel tank FT and the filler pipe 20. The attachment member 10 introduces to the inside of the fuel tank FT the fuel flowing down from the filler pipe 20 when the fuel is injected, and is arranged such that the fuel in the fuel tank FT does not flow backward to the filler pipe 20 side. In the present embodiment, an inlet check valve (ICV) is used as the attachment member 10, and the attachment member 10 is formed of a thermoplastic resin.

Figure 2:
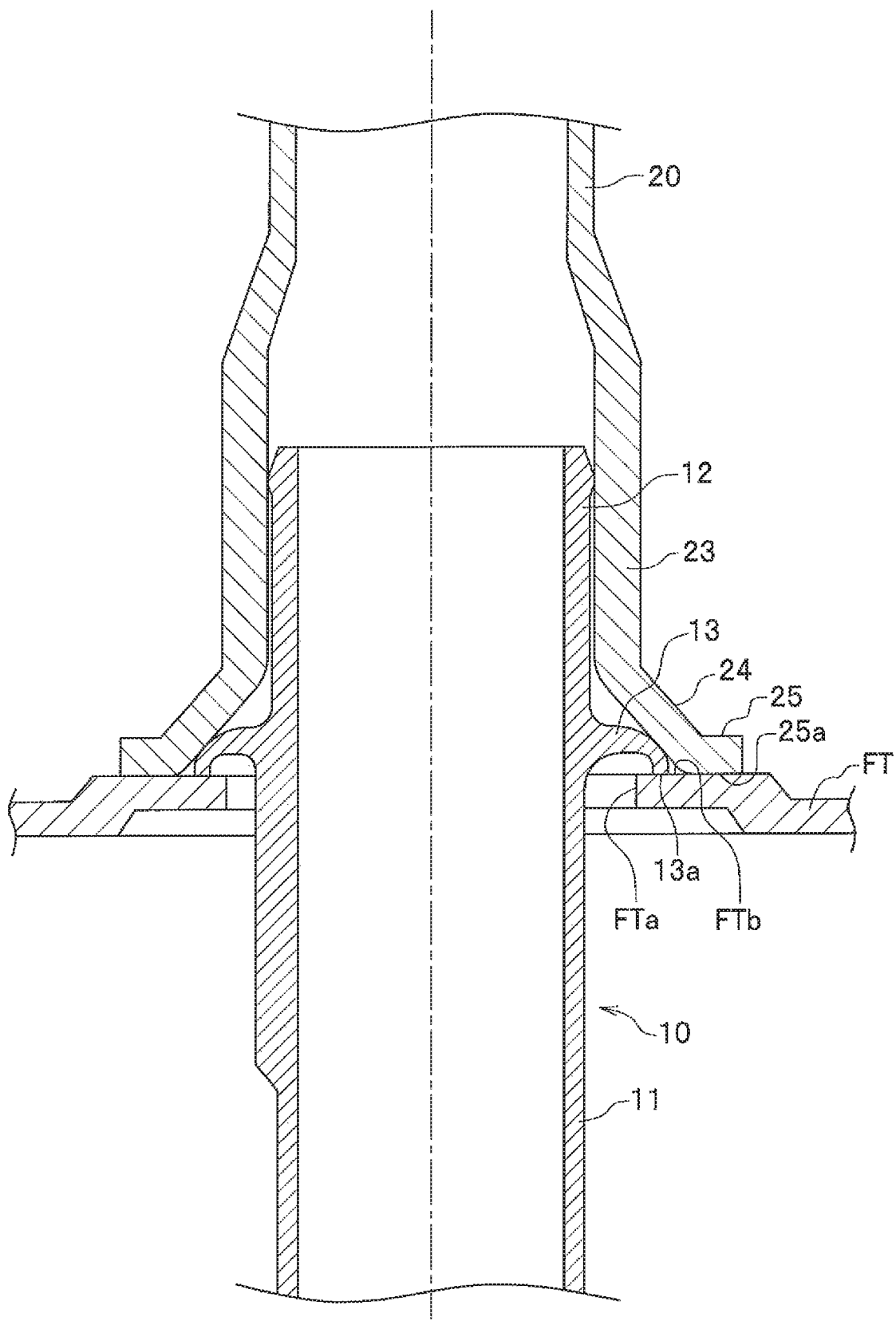
FIG. 2 is a magnified cross-sectional view of an essential portion of the filler-pipe attachment structure according to the present embodiment.

As illustrated in FIGS. 1 and 2, the attachment member 10 is mainly constituted by a main body portion 11, a protruding portion 12, and a first flange 13. The main body portion 11 is a portion having a cylindrical shape and being inserted inside the fuel tank FT. The outer diameter of the main body portion 11 is slightly smaller than the opening diameter of the opening FTa.

The protruding portion 12 is a portion having a cylindrical shape, continuing to the main body portion 11, and protruding to the outside of the opening FTa. The tip end side of the protruding portion 12 is fitted to the filler pipe 20. The outer diameter of the tip end side of the protruding portion 12 is equivalent to the inner diameter of the end portion of the filler pipe 20, so that the tip end side of the protruding portion 12 can be easily fitted to the filler pipe 20. In addition, the protruding portion 12 is fitted to the filler pipe 20 with such a fitting force that the filler pipe 20 can not easily come off the protruding portion 12 even during transportation or the like.

The first flange 13 radially protrudes outward from the outer circumferential surface of the protruding portion 12. The first flange 13 is continuously formed on the outer circumferential surface of the protruding portion 12 over the entire circumference of the protruding portion 12. In the present embodiment, the first flange 13 is formed to curve convexly toward the side farther from the opening FTa along the axial direction of the opening FTa. In addition, the first flange 13 is formed thick on the base side and thin on the edge side. A first opposed face 13a is formed on a portion of the first flange 13 opposed to the face FTb of the fuel tank FT. The first opposed face 13a is a portion to be welded to the face FTb.

In the present embodiment, the first flange 13 is formed to curve convexly toward the side farther from the opening FTa along the axial direction of the opening FTa. Alternatively, the first flange 13 may be formed perpendicular to the protruding portion 12.

As illustrated in FIG. 1, the filler pipe 20 is a cylindrical member formed of a thermoplastic resin, and introduces the fuel into the fuel tank FT. A fuel-filler-port portion 21 is formed on one end side of the filler pipe 20. A base portion 23, an inclined portion 24, and a second flange 25 are formed on the other end side of the filler pipe 20. A fuel filler gun is to be inserted into the fuel-filler-port portion 21.

The base portion 23 is a portion having a cylindrical shape. The protruding portion 12 is fitted into the base portion 23. The inclined portion 24 is a portion extending from the base portion 23 to the second flange 25. The inclined portion 24 is formed to have a diameter which increases with decrease in the distance to the opening FTa. Thus, the first flange 13 is inserted in the space formed with the inclined portion 24 and the face FTb.

The second flange 25 is a portion being formed to continue to the inclined portion 24 and radially protrude outward. The second flange 25 protrudes perpendicularly to the base portion 23. The second flange 25 is continuously formed over the entire circumference of an open end of the filler pipe 20. A second opposed face 25a is formed on a portion of the second flange 25 opposed to the face FTb of the fuel tank FT. The second opposed face 25a is a portion to be welded to the face FTb, and is flush with the first opposed face 13a.

Next, a filler-pipe attachment method according to the present embodiment is explained below. In the filler-pipe attachment method, a fitting step, an abutting step, and a welding step are performed.

In the fitting step, the attachment member 10 is fitted to the filler pipe 20. Specifically, in the fitting step, the protruding portion 12 is pushed into the base portion 23 so as to bring the first flange 13 into contact with the inclined portion 24 and bring the first opposed face 13a and the second opposed face 25a flush with each other. The attachment member 10 is fixed to the filler pipe 20 without rattle.

In the abutting step, after the attachment member 10 is attached to the filler pipe 20, the main body portion 11 is inserted through the opening FTa so as to bring the first flange 13 and the second flange 25 into contact with the face FTb. Thus, the first opposed face 13a and the second opposed face 25a come into face contact with the face FTb.

In the welding step, the first opposed face 13a and the second opposed face 25a are concurrently welded to the face FTb. Thus, attachment of the filler pipe 20 to the fuel tank FT is completed.

As explained above, in the filler-pipe attachment method according to the present embodiment, the first flange 13 and the second flange 25 are brought into contact with the face FTb around the opening FTa of the fuel tank FT after the cylindrical attachment member 10 is fitted into the opening of the filler pipe 20. Therefore, the operations for preparing for the welding can be easily performed. In addition, since the attachment member (ICV) is not assembled to the fuel tank in advance as in the conventional method, assembly error is unlikely to occur, so that attachment can be achieved with high precision.

In addition, since the attachment member is not assembled to the fuel tank in advance, the structure around the opening FTa of the fuel tank FT and the structure of the attachment member 10 can be simplified, and the respective members can be easily manufactured. Further, since both of the first flange 13 and the second flange 25 are welded to the face FTb, the penetration amount of hydrocarbon can be reduced. Although a sealing member may be inserted between the protruding portion 12 and the filler pipe 20, the sealing member can be dispensed with in the present embodiment because of the reduction in the penetration amount of hydrocarbon.

Furthermore, since the first opposed face 13a and the second opposed face 25a can be brought into contact with the face FTb of the fuel tank FT with high precision by bringing the first opposed face 13a and the second opposed face 25a flush with each other in the fitting step, the welding can be performed more easily and precisely. Moreover, in the fitting step in the present embodiment, when the protruding portion 12 is pushed into the base portion 23, the position of the first flange 13 is limited by the inclined portion 24, and the first opposed face 13a and the second opposed face 25a are brought flush with each other. Therefore, the positioning of each member can be easily performed. In addition, since the first flange 13 and the second flange 25 are located adjacent to each other, these flanges can be concurrently welded to the fuel tank FT.

Further, since the first flange 13 is formed to curve convexly toward the side farther from the opening FTa along the axial direction of the opening FTa, stress can be concentrated to the portions at which the first flange 13 comes in contact with the face FTb of the fuel tank FT. Therefore, the first opposed face 13a and the face FTb can be brought into face contact with high reliability, so that the precision in the welding can be further improved. Furthermore, since the first flange 13 is formed thick on the base side and thin on the edge side, the stress can be relatively more concentrated to the edge side of the first flange 13, and the strength of the base side can be improved.

Although an embodiment of the present invention is explained above, design modifications within the scope of the present invention can be made as needed.

LIST OF REFERENCE SIGNS

1: Filler-pipe Attachment Structure
10: Attachment Member (ICV)
11: Inserted Portion
12: protruding Portion
13: First Flange
13a: First Opposed Face
20: Filler pipe
21: Fuel-filler-port Portion
23: Base Portion
24: Inclined Portion
25: Second Flange
25a: Second Opposed Face
FT: Fuel Tank
FTa: Opening
FTb: Face

The invention claimed is:

1. A filler-pipe attachment structure in which a filler pipe is attached to an opening of a fuel tank through an attachment member; wherein
the attachment member includes,
a main body portion having a cylindrical shape and being inserted through the opening of the fuel tank,
a protruding portion having a cylindrical shape, continuing to the main body portion, and protruding to an outside of the opening of the fuel tank, and
a first flange radially protruding outward from an outer circumferential surface of the protruding portion;
the filler pipe includes,
a pipe member,
a fuel-filler-port into which a fuel filler gun is to be inserted,
a base which has a cylindrical shape and to which the protruding portion is directly fitted,
a second flange which radially protrudes outward from an outer circumferential surface of the base,
wherein the pipe member is a unitary single member, the fuel-filler-port is provided at an end of the pipe member and the base and the second flange are provided at the other end of the pipe member, and
wherein a first opposed face of the first flange which is opposed to a face around the opening of the fuel tank and a second opposed face of the second flange which is opposed to the face around the opening of the fuel tank are flush with each other, and the first opposed face and the second opposed face are directly welded to the face around the opening of the fuel tank, respectively.

2. The filler-pipe attachment structure according to claim 1, wherein the first flange is formed to curve convexly to a direction going away from the opening of the fuel tank along an axial direction of the opening of the fuel tank.

* * * * *